United States Patent [19]

DeHaan

[11] Patent Number: 4,543,304

[45] Date of Patent: Sep. 24, 1985

[54] LITHIUM CELL HAVING DEPLETION GAUGE

[75] Inventor: Abel DeHaan, Pembroke Pines, Fla.

[73] Assignee: Cordis Corporation, Miami, Fla.

[21] Appl. No.: 591,015

[22] Filed: Mar. 19, 1984

[51] Int. Cl.⁴ ............................................ H01M 10/48
[52] U.S. Cl. ........................................ 429/91; 429/92
[58] Field of Search ...................... 429/91, 92, 93, 90

[56] References Cited

U.S. PATENT DOCUMENTS

| 4,136,234 | 1/1979 | Fritts | 429/91 |
| 4,388,380 | 6/1983 | DeHaan et al. | 429/91 |
| 4,418,129 | 11/1983 | Goebel | 429/91 |

*Primary Examiner*—Charles F. LeFevour
*Attorney, Agent, or Firm*—Henry W. Collins; Thomas R. Vigil

[57] ABSTRACT

The electrochemical cell comprises an outer conductive housing, a cathode having one major surface in contact with the conductive housing, an insulative separator adjacent to the other major surface of the cathode, and a lithium anode having a major surface adjacent to the insulative separator. The lithium anode comprises three lithium plates, each having a major surface in contact with the other. Two of these major surfaces are formed with stepped portions to thereby form gaps between adjacent lithium plates. A first electrical sensing conductor is positioned within the gap between the surfaces of the first and second lithium anodes and is electrically connected to the first lithium anode and insulated from the second lithium anode. A second electrical sensing conductor is positioned within the gap between the surfaces of the second and third lithium anodes and is electrically connected to the second lithium anode and insulated from the third lithium anode.

27 Claims, 6 Drawing Figures

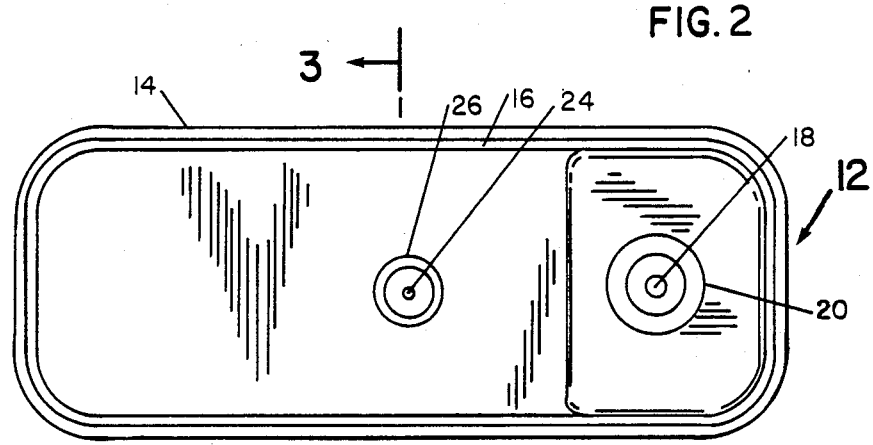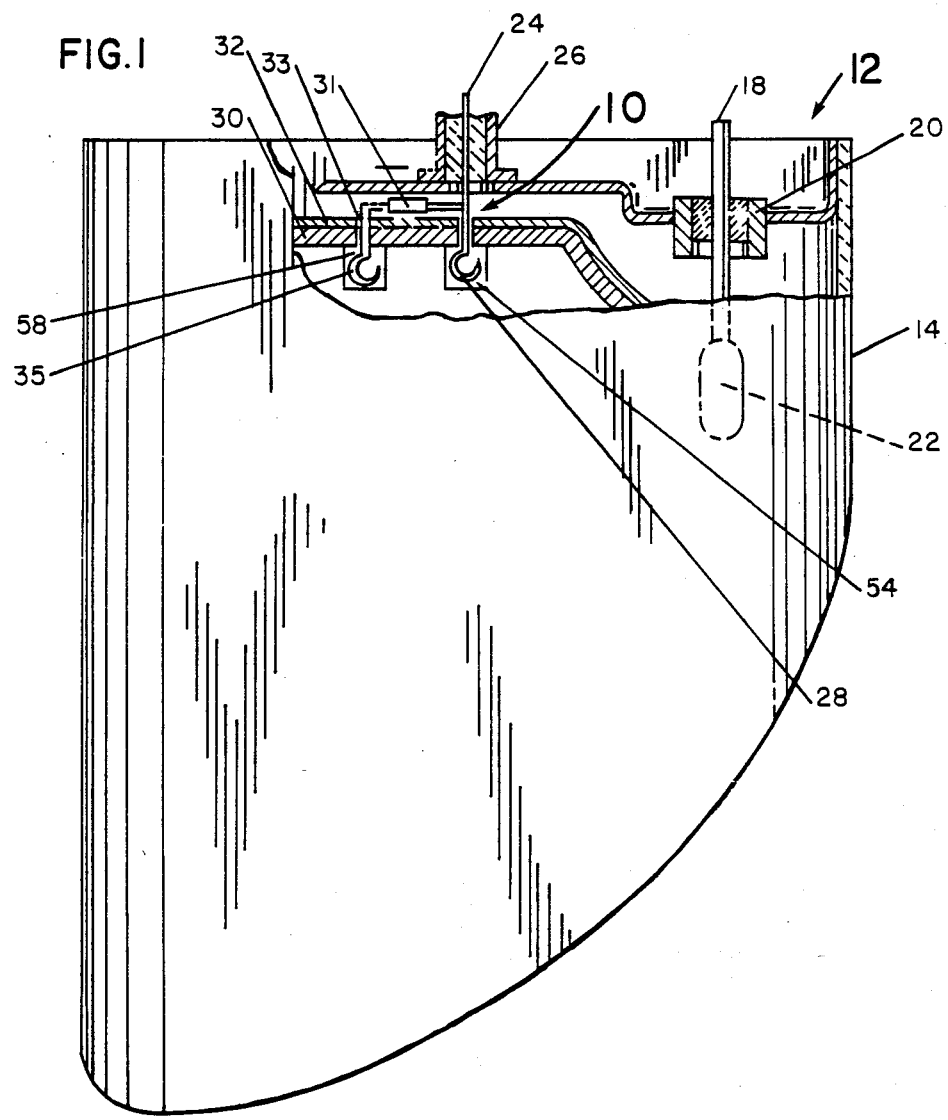

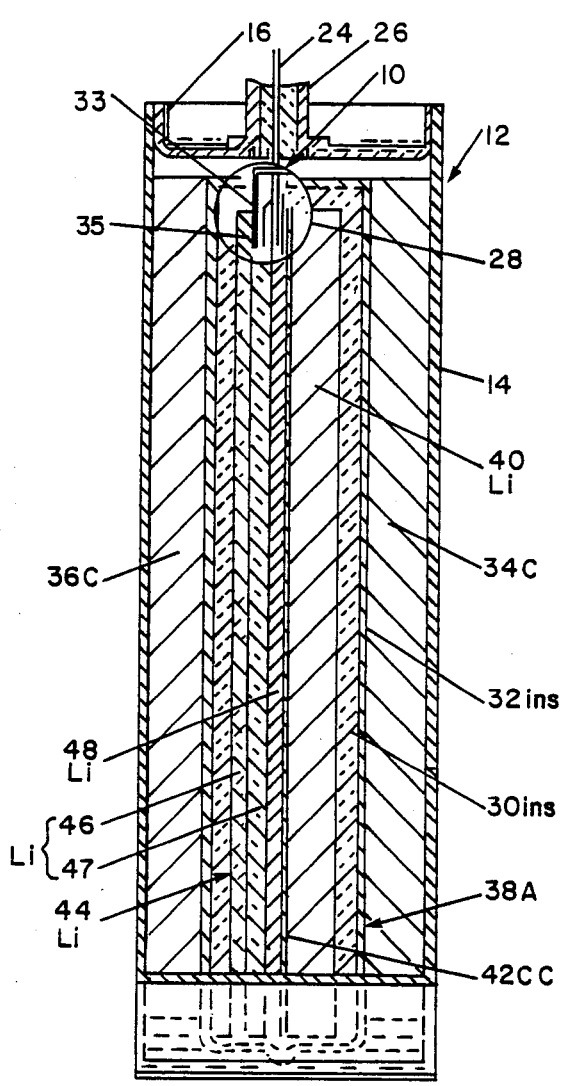
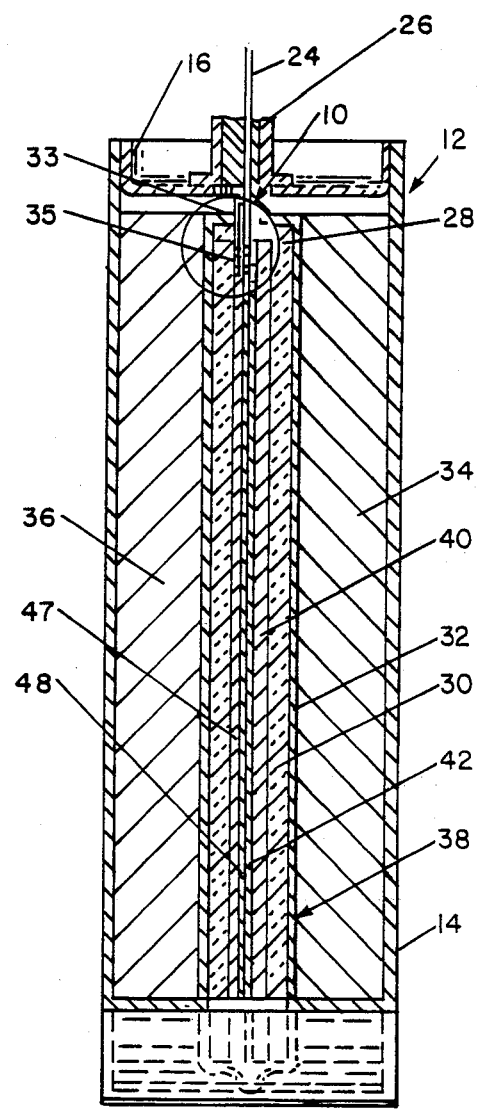
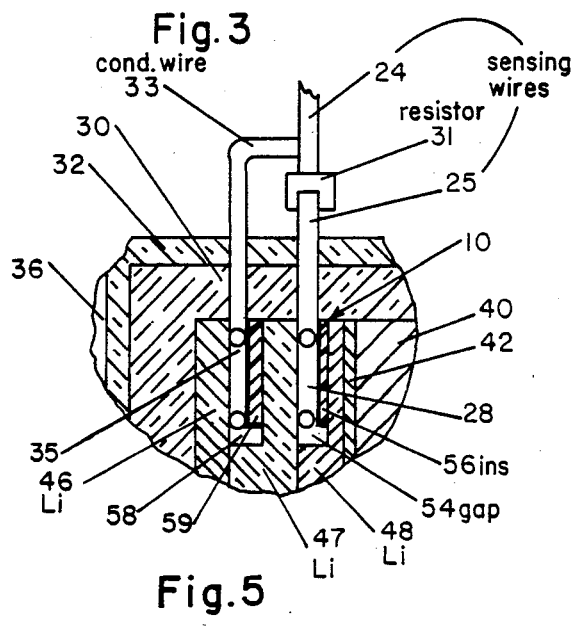
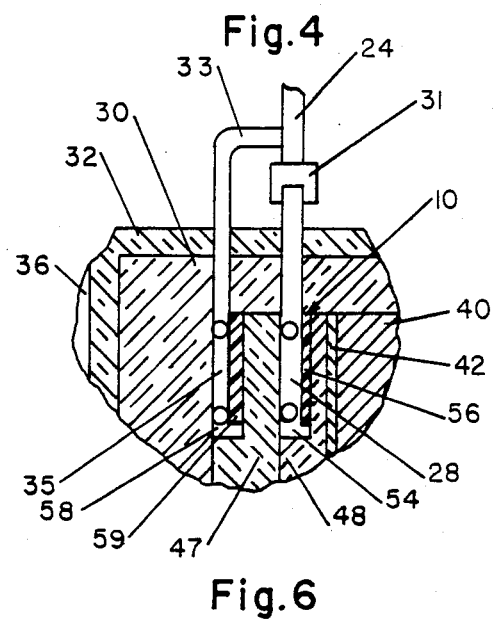

LITHIUM CELL HAVING DEPLETION GAUGE

BACKGROUND OF THE INVENTION

1. Field of the Invention

The present invention relates to lithium batteries and, more particularly, to lithium batteries having depletion gauges or indicators.

2. Description of the Prior Art

Lithium batteries have become well known for their long life and suitability as power sources for cardiac pacers and nerve stimulators. Normally these batteries utilize a lithium anode, a cathode formed of cupric sulfide or silver chromate, and an electrolytic solution.

With the long life associated with such batteries and due to the fact that such batteries are generally implanted within the human body, it is desirable to have a method for indicating that a predetermined level of discharge has occurred. This is particularly important in life sustaining devices, such as cardiac pacers, in order to provide adequate time for the replacement of the device before failure occurs.

An important feature of the present invention is that of providing means within a battery for providing a positive indication when at least two predetermined levels of discharge have occurred, or conversely, to provide a positive indication when the remaining life of a battery has reached a first and then a second predetermined level.

It is important that the positive indication of remaining battery life be provided regardless of the type of service the battery has been providing. In addition, it is important that the depletion indicator be compatible with the present construction and configuration of lithium batteries utilized in implanted devices such as cardiac pacers and nerve stimulators.

In certain types of lithium batteries, the internal resistance of the battery increases linearly with the discharge of the cell. With this type of battery, the output voltage provides a satisfactory indication of the remaining life of the cell.

With certain lithium batteries used in cardiac pacers, the voltage output remains approximately constant until the cell is substantially completely discharged. With other types of lithium batteries, such as the lithium-cupric sulfide battery, an end-of-life indication may be obtained by taking advantage of the two stages of discharge, i.e.:

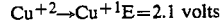
$Cu^{+2} \rightarrow Cu^{+1} E = 2.1$ volts

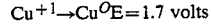
$Cu^{+1} \rightarrow Cu^{0} E = 1.7$ volts

By adjusting the ratio of lithium to cupric sulfide, it is possible to control the ratio of these two reactions. Accordingly, when the transition from the higher voltage to the lower voltage occurs, this change in voltage provides an indication that a predetermined level of discharge of the cell has occurred. In batteries used with cardiac pacers, the length of the second voltage level is adjusted to be approximately 10 percent of the first voltage level. One problem with these dual voltage level systems is that once the second level is obtained, the battery may then last from three months to one year depending upon the load applied to the battery at the lower voltage level.

With cardiac pacers of more modern design which include complex programmable capabilities, the drain on the battery may vary over a broad range. It therefore becomes desirable to have additional means for evaluating the residual capacity of the battery at a time early enough to establish orderly plans for the replacement of the device. Also, it is desirable to have an early indication of an initial depletion of the battery and then a second indication at a time when the battery and/or pacer should be replaced.

SUMMARY OF THE INVENTION

The lithium battery of the present invention includes an outer conductive housing, a cathode having one major surface in contact with the conductive housing, an insulative separator adjacent to the other major surface of the cathode, and a lithium anode having a major surface adjacent to the insulative separator. The lithium anode can comprise three lithium plates, each having a major surface in contact with the other. Conductive sensing elements are positioned between each of the plates and pressure is applied to the plates to embed the conductive sensing elements within the plates. The sensing elements are in electrical contact with one of the adjacent lithium plates and are electrically isolated from the other adjacent lithium plates. With this arrangement, a first electrical potential which exists between a first conductive sensing element through a first lithium plate and the outer conductive housing decreases to a predetermined level when the first lithium plate in contact with that conductive sensing element has been consumed and a second electrical potential then exists between a second conductive sensing element through a second lithium plate and the outer conductive housing and decreases to zero volts when the second lithium plate in contact with that conductive sensing element has been consumed to thereby provide an indication of predetermined levels of discharge of the cell.

By varying the ratio of the thickness of the two consumable lithium plates with respect to each other and with respect to the remaining lithium plate, it is possible to vary the percentage of depletion which brings about the first and second indications of predetermined levels of discharge. Accordingly, the first indication of a first predetermined level of discharge may be utilized to initiate planning for an orderly replacement of the battery, and the second indication may be utilized to initiate the immediate replacement of the battery.

According to one preferred embodiment of the present invention, there is provided an electrochemical cell comprising: an outer conductive housing; a cathode material inside said housing and in direct electrical contact with said housing; at least first and second adjacent anode materials inside said housing and spaced from said cathode material by porous insulative separator saturated with an electrolyte; a first anode lead; first and second electrical conductors connected respectively to said first and second anode materials; a resistor coupling one of said first and second electrical conductors to said first anode lead; said other electrical conductor being directly coupled to said first anode lead; a first voltage potential being developed between said first anode lead and said conductive housing through said first anode material until said first anode material is consumed and said first conductor is no longer in electrical contact with any anode material and a second voltage potential then being developed between said first anode lead and said conductive housing through said second conductor, said second voltage potential being different than said first voltage potential as a result of said resistor being coupled between one of said first and second conductors and said first anode lead, and said different second voltage potential indicating a predetermined level of discharge of said cell.

BRIEF DESCRIPTION OF THE DRAWINGS

FIG. 1 is a side elevational view, shown partly in section, of a lithium battery having a depletion gauge constructed according to the teachings of the present invention.

FIG. 2 is a top view of the battery illustrated in FIG. 1.

FIG. 3 is a sectional view of the battery shown in FIG. 2 and is taken along and in the direction of the line 3—3 of FIG. 2 prior to any depletion of the battery.

FIG. 4 is a sectional view of the battery similar to the view illustrated in FIG. 3 but shows the battery after depletion of the anode therein to a first predetermined level of discharge of the battery.

FIGS. 5 and 6 are enlarged views of portions of FIGS. 3 and 4, respectively, and illustrate in more detail the construction of the depletion gauge of the present invention.

DESCRIPTION OF THE PREFERRED EMBODIMENT

FIGS. 1 and 2 generally illustrate a depletion gauge 10 of the present invention shown in conjunction with a lithium battery 12. The battery 12 is of a type which may be used with cardiac pacers. More particularly, the lithium battery 12 includes an outer conductive case 14 which is preferably drawn as one piece from stainless steel. A lid member 16 is also drawn as one piece from stainless steel and is welded to the top of the conductive case 14 in order to provide a hermetically sealed housing.

An anode lead 18 extends through the lid member 16 by way of a glass-to-metal seal 20. One of the ends 22 (shown in phantom) of the anode lead 18 is flattened for electrical contact to a lithium anode (not shown) within the battery 12.

FIGS. 3, 4, 5 and 6 illustrate the battery 12 and the associated depletion gauge 10. More particularly, FIG. 3, and the corresponding FIG. 5, illustrate the battery 12 and depletion gauge 10 prior to any load, such as a cardiac pacer, being applied to the battery 12. FIG. 4, and the corresponding FIG. 6, illustrate the battery 12 and the depletion gauge 10 after the battery 12 has been depleted to a first predetermined level necessary to provide a first indication of a predetermined depletion level.

As further illustrated in FIGS. 3 and 5, a pair of cathode plates 34, 36 are positioned with the conductive case 14 with major surfaces of each of the cathode plates 34, 36 in direct electrical contact with the conductive case 14. The cathode plates 34, 36 may be formed of various materials but are preferably formed of cupric sulfide.

An anode assembly 38 is also positioned within the conductive case 14 and is interposed between the cathode plates 34, 36. The anode assembly 38 includes a first lithium anode 40 which is in electrical contact with a current collector 42. The current collector 42 is in turn electrically connected to the end 22 of the anode lead 18 (FIG. 1). A second lithium anode 44 is situated on the other side of the current collector 42 and comprises two lithium plates 46 and 47 which have major surfaces in electrical contact with each other. Another lithium plate 48 is situated between the lithium plate 47 and the current collector 42. The first lithium anode 40, the current collector 42 and the three lithium plates 46, 47 and 48 are covered by an outer insulative covering 30. A second insulative cover 32 is positioned around the first insulative covering 30 to provide a more complete seal between the first lithium anode 40 and the second lithium anode 44 and the cathode plates 34, 36. With this construction, two parallel connected cells are established between anodes 40 and 44 respectively and conductive case 14.

The depletion gauge 10 includes a first conductive sensing wire 24 which extends through the lid member 16 by way of a glass-to-metal seal 26. The sensing wire 24 is coupled through a resistor 31 to a sensing wire 25 and extends through both of the insulative coverings 30, 32. When pressure is applied to the inner and middle lithium plates 48, 47, a gap 54 is formed between the plates in the region of the sensing wire 25 so that the wire 25 becomes electrically bonded to the middle lithium plate 47.

As is illustrated in more detail in FIG. 5, an end 28 of the sensing wire 25 is formed with a crook or bent hook configuration and is placed in direct electrical contact with the middle lithium plate 47. An insulative pad 56 is interposed between the end 28 of the sensing wire 25 and the inner lithium plate 48 within the gap 54 to electrically isolate the inner lithium plate 48 from the sensing wire 25. The lithium plates 47, 48 are then pressed together to surround and conform to the end 28 of the sensing wire 25 and the insulative pad 56.

The depletion gauge 10 also includes a conductive wire 33 which is connected directly to the first sensing wire 24 at a position within the conductive case 14 located between the lid member 16 and the second insulative covering 32. The end 35 of the second sensing wire 33 is also formed with a crook or bent hook configuration and is placed in direct electrical contact with the outer lithium plate 46. An insulative pad 59 is interposed between the end 35 of the sensing wire 33 and the middle lithium plate 47 within a gap 58 formed when the lithium plates 46, 47 are pressed together to become bonded while conforming to the sensing wire 33 and the insulative pad 59 therebetween in order to electrically isolate the middle plate 47 from the sensing wire 33.

As is now apparent with reference to FIGS. 3 and 5, a first voltage potential will be developed between the sensing wire 24 through the sensing wire 33 and through the lithium plate and the conductive case 14. At the point in time at which the outer lithium plate 46 has been consumed, the sensing wire 33 is no longer in electrical contact with any lithium material with the result that the first voltage potential between the sensing wire 24 and the conductive case 14 no longer exists and a second lesser voltage potential is established between sensing wire 24 through wire resistor 31, wire 24 and lithium plate 47 and the conductive case 14.

FIGS. 4 and 6 further illustrate the battery 12 at the point in time when the outer lithium plate 46 has been depleted or consumed and the cathode plates 34, 36 have increased in thickness after material from the consumed lithium plate 46 has migrated to the cathode plates 34, 36. The second voltage potential developed between the sensing wire 24 and the outer conductive case 14 is lower than the first voltage potential due to the voltage drop across resistor 31. At the point in time at which the outer and middle lithium plates 46, 47 have been consumed, the sensing wire 25 is no longer in electrical contact with any lithium material with the result that the voltage potential between the sensing wire 24 and the conductive case 14 decreases to zero volts.

Accordingly, consumption of the outer lithium plate 46 results in a decrease in the first voltage potential developed between the sensing wire 24 and the conductive case 14 to the second voltage developed between the sensing wire 24 and the conductive case 14 and this second voltage potential is maintained at a predetermined value less than the first voltage potential by an amount equal to the voltage drop across the resistor 31. However, the voltage potential for a device powered by the battery 12 continues to be developed by the battery since the first lithium anode 40 has been only partially consumed and the lithium plates 47, 48 of the second lithium anode 44, now being part of the first anode 40, have not yet been consumed. At this point in time, steps should be taken for replacing the battery 12 in the very near future.

As may be apparent, the ratio of the inner lithium plate 48, the middle lithium plate 47 and the outer lithium plate 46 may be adjusted so that the indication of battery depletion may be provided at any predetermined percentage of total battery depletion. For example, if the ratio of the thickness of the outer lithium plate 46 to the thickness of lithium plates 47, 48 is made equal to 1 to 10, the voltage between the sensing wire 33 and the conductive case 14 will drop to zero when the battery 12 is 10 percent depleted. Obviously, other ratios could be utilized to give different percentages of depletion.

In order to compare the voltage potentials developed by the anode assembly 38, the thickness of the lithium anode 40 is made equal to the combined thickness of the outer, middle and inner lithium plates 46, 47, 48, so that the voltage potential that is developed between the anode lead 18 and the conductive case 14 is equal to the initial first voltage potential developed between the sensing wire 33 and the conductive case 14.

The anode leads 18 and 24 have the came cathode-terminal-forming case 14 such that two parallel cells are established between the anode leads 18 and 24 and the cathode-terminal-forming case 14. Accordingly, the decrease in the first voltage potential when the outer lithium anode 46 is consumed, as well as the lower second voltage potential developed between the sensing wire 24 and the conductive case 14, can be monitored and compared to the voltage potential between the anode lead 18 and the conductive case 14.

When the middle and inner lithium plates 47, 48 have been consumed, the voltage potential developed by the sensing wires 24, 25 decreases to zero and the battery 12 should be replaced immediately.

While a preferred embodiment has been illustrated with a cathode element of cupric sulfide and an anode element of lithium, it should be appreciated that the invention is useful with any elements which are physically consumed during depletion of the battery. Also, while the lithium anodes 40 and 44 have been shown as having a plate or slab configuration, it should be understood that the invention is equally applicable to anodes of other configurations. Also, the resistor 31 can be coupled between the sensing wire 33 and the sensing wire 24 instead of between the sensing wire 25 and the sensing wire 24.

Thus, while a preferred embodiment of the invention has been described and shown in particularity, the invention may be embodied in various other configurations and arrangements.

I claim:

1. An electrochemical cell comprising: an outer conductive housing; at least one cathode member positioned within said conductive housing and having two major surfaces one of which is in direct electrical contact with said conductive housing; an insulative separator positioned against the other major surface of said cathode member; a first lithium anode of a predetermined thickness having first and second major surfaces, said first surface thereof being positioned adjacent to said insulative separator; a second lithium anode of a predetermined thickness having first and second major surfaces, said first surface thereof being positioned adjacent to said second surface of said first lithium anode, said first major surface of said second lithium anode having a stepped portion to thereby form a gap between a portion of said first surface of said second lithium anode and said second surface of said first lithium anode; a first electrical sensing conductor positioned within said gap between said surfaces of said first and second lithium anodes, said first electrical conductor being in electrical contact with said first lithium anode; an insulative pad interposed between said first electrical sensing conductor and said second lithium anode; a third lithium anode of a predetermined thickness having first and second major surfaces, said first surface thereof being positioned adjacent to said second surface of said second lithium anode, said first major surface of said third lithium anode having a stepped portion to thereby form a gap between a portion of said first surface of said third lithium anode and said second surface of said second lithium anode; a second electrical sensing conductor positioned in electrical contact with said second surface of said second lithium anode; a first anode lead electrically connected to said first and second electrical sensing conductors, said lead extending out of said conductive housing and being electrically insulated from said housing; said first electrical sensing conductor coupled to said anode lead so that a first electrical potential is developed between said first electrical sensing conductor and said conductive housing until said first lithium anode is consumed by discharge of the cell to provide a first indication of a predetermined level of discharge of the cell; said second electrical sensing conductor coupled through a resistor to said anode lead so that a second electrical potential is developed between said second electrical sensing conductor and said conductive housing until said second lithium anode is consumed by discharge of the cell to thereby provide a second indication of a predetermined level of discharge of the cell.

2. A lithium cell as defined in claim 1 including a fourth lithium anode of a thickness equal to approximately the combined thickness of said first, second and third anodes, said fourth lithium anode being electrically connected to a second anode lead which extends out of said conductive housing and being electrically insulated from said housing.

3. A lithium cell as defined in claim 2 including a second cathode member positioned within said conductive housing and having two major surfaces, one of which is in direct contact with said conductive housing, and a second insulative separator interposed between said second cathode member and said fourth anode.

4. A lithium cell as defined in claim 1 wherein the ratio of the thickness of said first anode to the combined thickness of said second and third anodes is approximately 1 to 10.

5. A lithium cell comprising: at least one cathode member positioned within a conductive housing and having two major surfaces, one of which is in direct electrical contact with said conductive housing; an insulative separator being positioned against an outer major surface of said cathode member; a first lithium anode of a predetermined thickness having first and second major surfaces, said first major surface thereof being positioned adjacent to said insulative separator, said second major surface of said first lithium anode having a stepped portion; a second lithium anode of a predetermined thickness having first and second major surfaces, said first surface thereof being positioned adjacent to said second surface of said first lithium anode over substantially the entire surface area of said second surface of said first lithium anode; a first electrical sensing conductor positioned between said surfaces of said first and second lithium anodes in a region defined by said stepped portion of said surface of said first lithium anode, said first electrical conductor being in electrical contact with said first lithium anode; an insulative pad interposed between said first electrical sensing conductor and said second lithium anode; said second major surface of said second lithium anode having a stepped portion; a third lithium anode of a predetermined thickness having first and second major surfaces, said first surface thereof being positioned adjacent to said second surface of said second lithium anode; a second electrical sensing conductor positioned within said gap between said surfaces of said second and third lithium anodes, said electrical conductor being in electrical contact with said second lithium anode; an insulative pad interposed between said second electrical sensing conductor and said third lithium anode; a first anode lead electrically connected to said first and second electrical sensing conductors, said anode lead extending out of said conductive housing and being electrically insulated from said housing; said first electrical sensing conductor coupled to said anode lead so that a first electrical potential is developed between said first electrical sensing conductor and said conductive housing until said first lithium anode is consumed by discharge of the cell to thereby provide a first indication of a predetermined level of discharge of the cell; said second electrical sensing conductor coupled through a resistor to said anode lead so that subsequent to the depletion of said first lithium anode a second electrical potential is developed between said second electrical sensing conductor and said conductive housing until said second lithium anode is consumed by discharge of the cell to thereby provide an indication of a predetermined level of discharge of the cell; and a second anode lead electrically connected to said third lithium anode, said lead extending out of said conductive housing and being electrically insulated from said housing.

6. A lithium cell as defined in claim 5 including a fourth lithium anode of a thickness equal to approximately the combined thickness of said first, second and third anodes, said second anode lead being electrically connected to said fourth anode.

7. A lithium cell as defined in claim 6 including a second cathode member positioned within said conductive housing and having two major surfaces, one of which is in direct contact with said conductive housing, and a second insulative separator interposed between said second cathode member and said fourth anode.

8. A lithium cell as defined in claim 5 wherein the ratio of the thickness of said first anode to the combined thickness of said second and third anodes is approximately 1 to 10.

9. An electrochemical cell comprising: an outer conductive housing; a cathode material inside said housing and in direct electrical contact with said housing; at least first and second adjacent lithium anode materials inside said housing and spaced from said cathode material by porous insulative separator saturated with an electrolyte; a first anode lead; first and second electrical sensing conductors connected respectively to said first and second anode materials; a resistor coupling one of said first and second electrical conductors to said first anode lead; said other electrical conductor being directly coupled to said first anode lead; a first voltage potential being developed between said first anode lead and said conductive housing through said first anode material until said first anode material is consumed and said first conductor is no longer in electrical contact with any anode material and a second voltage potential then being developed between said first anode lead and said conductive housing through said second conductor, said second voltage potential being different than said first voltage potential as a result of said resistor being coupled between one of said first and second conductors and said first anode lead, and said different second voltage potential indicating a predetermined level of discharge of said cell.

10. The cell of claim 9 wherein said first electrical conductor is electrically connected to said first anode material and an insulative pad is interposed between said first electrical conductor and second anode material to insulate said first conductor from said second anode material.

11. The cell of claim 9 wherein said second electrical conductor is electrically connected to said second anode material and insulated from any other anode or cathode material in said cell.

12. The cell of claim 9 wherein said second electrical conductor is coupled to said first anode lead through said resistor.

13. The cell of claim 9 wherein said cell includes a third lithium anode material forming a cell with said conductive housing in parallel with said first named cell.

14. The cell of claim 13 including a current collector plate interposed between said third anode material and said second anode material.

15. The cell of claim 14 wherein a fourth lithium anode material is positioned between said second anode material and said current collector plate.

16. The cell of claim 15 wherein said second electrical conductor is positioned between said fourth anode material and said second anode material, and an insulative pad is interposed between said second conductor and said fourth anode material to insulate said second electrical conductor from said fourth anode material.

17. The cell of claim 16 being sized, configured and arranged so that after said second anode material is consumed, the second conductor is not in contact with any anode material and the voltage potential at the first anode lead falls to zero to provide a second indication that the cell needs to be replaced, and wherein a second anode lead is coupled to said current collector plate whereby said battery can continue to deliver current at the voltage potential between said current collector plate and said conductive housing until the third and fourth anode material are consumed.

18. The cell of claim 13 wherein a second a node lead is electrically connected to said third a node material which extends out of said conductive housing and which is insulated from said conductive housing.

19. The cell of claim 15 wherein said predetermined level of discharge of said cell is determined by varying the thicknesses of said first, second and fourth anode materials.

20. The cell of claim 19 wherein the ratio of thickness of said first anode material to said second and said fourth anode materials is 1 to 10 to give an indication of 10 percent depletion of said cell.

21. The cell of claim 13 wherein the thickness of said third anode material is equal to the combined thickness of said first and second anode materials.

22. The cell of claim 15 wherein the thickness of said third anode material is equal to the combined thickness of said first, second and fourth anode materials.

23. The cell of claim 9 wherein said first and second conductors each have a loop formation at their ends which is in direct electrical contact with upper portions of said first and second anode materials respectively.

24. The cell of claim 9 wherein said first and second conductors each have a hook formation at their ends which is in direct electrical contact with upper portions of said first and second anode materials respectively.

25. The cell of claim 9 wherein said first and second conductors each are flattened at their ends and are in direct electrical contact with upper portions of said first and second anode materials respectively.

26. The cell of claim 9 wherein said predetermined level of discharge of said cell is determined by varying the thicknesses of said first and second anode materials.

27. The cell of claim 26 wherein the ratio of thickness of said first anode material to said second anode material is 1 to 10 to give an indication of 10 percent depletion of said cell.

* * * * *